(12) United States Patent
Wolfston, Jr.

(10) Patent No.: US 8,280,811 B2
(45) Date of Patent: Oct. 2, 2012

(54) METHOD AND APPARATUS FOR INCREASING CHARITABLE DONATIONS BY PROVIDING INSTANTANEOUS DONOR RECOGNITION

(75) Inventor: James H. Wolfston, Jr., West Linn, OR (US)

(73) Assignee: Collegenet, Inc., Portland, OR (US)

( * ) Notice: Subject to any disclaimer, the term of this patent is extended or adjusted under 35 U.S.C. 154(b) by 0 days.

(21) Appl. No.: 13/248,258

(22) Filed: Sep. 29, 2011

(65) Prior Publication Data

US 2012/0023014 A1    Jan. 26, 2012

Related U.S. Application Data

(63) Continuation of application No. 12/015,206, filed on Jan. 16, 2008, now Pat. No. 8,032,463, which is a continuation of application No. 09/300,881, filed on Apr. 28, 1999, now Pat. No. 7,321,876.

(60) Provisional application No. 60/083,401, filed on Apr. 29, 1998.

(51) Int. Cl.
  G06Q 40/00  (2012.01)
(52) U.S. Cl. ........................................................ 705/39
(58) Field of Classification Search .................. 705/39
  See application file for complete search history.

(56) References Cited

U.S. PATENT DOCUMENTS

| | | | |
|---|---|---|---|
| 5,111,395 A * | 5/1992 | Smith et al. ...................... 705/45 |
| 5,466,919 A | 11/1995 | Hovakimian | |
| 5,621,640 A | 4/1997 | Burke | |
| 5,663,547 A | 9/1997 | Ziarno | |
| 5,665,952 A | 9/1997 | Ziarno | |
| 5,710,887 A | 1/1998 | Chelliah et al. | |
| 5,715,314 A | 2/1998 | Payne et al. | |
| 5,727,156 A | 3/1998 | Herr-Hoyman et al. | |
| 5,737,414 A | 4/1998 | Walker et al. | |
| 5,909,794 A | 6/1999 | Molbak et al. | |
| 5,940,834 A | 8/1999 | Pinard et al. | |
| 6,052,674 A | 4/2000 | Zervides et al. | |
| 6,052,723 A | 4/2000 | Ginn | |
| 6,112,191 A * | 8/2000 | Burke ............................. 705/41 |

(Continued)

FOREIGN PATENT DOCUMENTS

JP    2002259880    9/2002

OTHER PUBLICATIONS

YMCA of New York, Apr. 15, 1998.*

(Continued)

*Primary Examiner* — Pierre E Elisca
(74) *Attorney, Agent, or Firm* — Scheinberg & Associates, PC; Michael O. Scheinberg; John B. Kelly

(57) ABSTRACT

Charitable donations are increased by automatically providing immediate on-line recognition of on-line donors. A list of donors is maintained on a Web page acknowledging the on-line contributions. Donor names on the list can be links to additional information about the donation or the donor. Information about donor and donation is entered by the donor, who can specify what information is to be published on the Web and what information is to remain unpublished. The donor list can be arranged in order of donation size, and donors can compete for position on the list. The donor information can indicate membership in a group, and donations can also be totaled by group to encourage donation competition between groups.

22 Claims, 9 Drawing Sheets

U.S. PATENT DOCUMENTS

| | | |
|---|---|---|
| 6,253,998 B1 | 7/2001 | Ziarno |
| 6,308,887 B1 | 10/2001 | Korman et al. |
| 6,351,905 B1 | 3/2002 | Dean |
| 6,542,875 B1 | 4/2003 | Mulvihill et al. |
| 6,578,010 B1 | 6/2003 | Teacherson |
| 7,321,876 B1 | 1/2008 | Wolfston |
| 2002/0073026 A1 | 6/2002 | Gruber et al. |
| 2005/0004867 A1 | 1/2005 | Spector |
| 2005/0021353 A1* | 1/2005 | Aviles et al. .............. 705/1 |
| 2007/0078766 A1 | 4/2007 | Thomas |

OTHER PUBLICATIONS

"Fund Raising and the Internet," Hewitt and Johnston Consultants, Professional Fundraising, Sep. 1995, 7 pgs.

Bailey, Sean, "Service Puts Nonprofit Web Donations on Phone Bills," Philanthropy Journal, Apr. 9, 1998, 3 pgs.

Ensman, Richard G., Jr., "Turn 'Small Shops' into 'Big Shops' Via the Internet," Fund Raising Management, Garden City, Jun. 1997, vol. 28, Iss. 4, 3 pgs.

Clark, James P., "Non Profits in Cyberspace: The fund raiser's guide, Fund Raising Management", Garden City, Oct. 1995, vol. 26, Iss. 8, p. 28, 5 pgs.

Anonymous, "Campaign Finance Reports Available On Line, Fund Raising Management", Garden City, Feb. 1998, vol. 28, Iss. 12, p. 9, 1pg.

Anonymous, "HDCS and IBM Create Internet Donation Management System", Fund Raising Management, Garden City. Feb. 1999, vol. 29, Iss. 12, p. 7, 1 pg.

White, Ron, How Computers Work, 4th Edition, Que Corporation, 1998, Pages: Table of Contents, 1-7, Index.

Muller, Nathan J., Desktop Encyclopedia of the Internet, Artech House, Inc., 1998, Pages: Table of Contents, 1-209.

Borland's Paradox for Windows, Borland International, Inc., 1994 Pages: Table of Contents, pp. 538-563.

Riley, David D., Data Abstraction and Structures, An Introduction to Computer Science II, Boyd and Fraser Publishing Company, 1987, Pages: Table of Contents, Preface, 1-3, Index.

"FCC at 'Crossroads' on Diversity", Television Digest, v38, n8, Feb. 23, 1998, 2 pgs.

Retooling: books and reports (brief description of new products and publications), Marketing Tools, vol. 5, No. 6, p50 (4), Jul. 1998, 8 pgs.

Muller, Nathan J., Desktop Encyclopedia of the Internet, Artech House, Inc., 1998, Pages: Table of Contents, 539-559.

YMCA Greater New York: YMCA of Greater New York Expands Reach with New Website, Apr. 15, 1998, Byline: Internet/On-Line Writers.

* cited by examiner

Generic University Home Page  /—38
Hometown, State

Admission Online
44—/ Catalogs & Schedules | Hot Topics | Maps | Phone Book | Web Style and Help | Keyword Search

Visitor Center
44—/ About HSU | Prospective Students | Unique Resources

Campus Update
44—/ People | Athletics & Events | News & Publications

Student Site (Text Version)
44—/ Academics & Registration | Financial Aid, Jobs, Housing & Health | Life & Activities

Main Campus
44—/ Alumni & Friends | Colleges & Departments | Libraries, Media & Computing | Administration & Support Services

Frontiers in Education
44—/ Courses on the Web | Extension Service | International | HSU Statewide | Research

Donations
46—/

Mailing Address: Generic State University, Hometown, State 22222 USA
Campus Phone Number: 222/222-2222

Fig. 2

@lumn  ⟵ 72

| | |
|---|---|
| Name | Your Name |
| Address | Your Address |
| Email | You@whatever.com |
| Hobbies | music |
| Alumnus | Yes |
| My favorite things about Generic University | The pinball machine in the Student Union... |
| About me/career/etc. | A successful alumnus |
| Link to personal web page | http://www.whatever.com/you/ |

[ Back to Top ]

@lumni 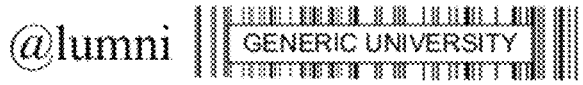

NOTE:

Once you have chosen a payment method below and completed the payment transaction you will not be able to resubmit this donation or change any of the data on it Please be sure all the information on your donation is correct and in the form you want it. If you want to review or change your donation now use the "Back" button on your browser.

In order to transmit your donation to the (your college) Alumni Fund, you need to verify the charge and select a payment method from the choices below:

Donor: John Q. Public

Choose a payment method:

Debit Card

Visa/MasterCard via Secure Server

Copyright© 1998 Universal Algorithms, Inc.
Email Feedback

Fig. 8

Enter your donation to the Generic University @lumni Fund:

Name: John Q. Public

Amount: $100

Allocate Donation: Orchestra / Football / Endowment / Scholarship

Dedicate Donation: In loving memory of Sarah

METHOD AND APPARATUS FOR INCREASING CHARITABLE DONATIONS BY PROVIDING INSTANTANEOUS DONOR RECOGNITION

This application claims priority from U.S. patent application Ser. No. 12/015,206, filed Jan. 16, 2006, and U.S. patent application Ser. No. 09/300,881, filed Apr. 28, 1999, now U.S. Pat. No. 7,321,876, and from U.S. Provisional Patent application No. 60/083,401, filed Apr. 29, 1998, which are hereby incorporated by reference.

TECHNICAL FIELD OF THE INVENTION

This invention relates to increasing charitable donations by enhancing recognition of donors, and in particular, to increasing donations made electronically over a computer network.

BACKGROUND OF THE INVENTION

As government support for non-profit institutions decreases, institutions are looking more to individuals and corporations for financial support. More than two thirds of all U.S. households make charitable donations. Americans gave an estimated $120 billion in voluntary contributions in 1996. Of this amount, about $70 billion was donated for religious purposes, $18 billion for education, and $26 billion for health and human services.

Non-profit organizations have limited resources with which to develop contributions, and it is cost effective for them to spend those resources developing large donors. Although recognition of donors is known to be an important factor in encouraging repeat donations, small donors are often not given the attention and recognition that is necessary to encourage repeat donations. Because lower income donors tend to contribute a larger proportion of their income to charities than do higher income individuals, small donors can be a significant source of income for nonprofit organizations.

Even large donors often do not obtain the recognition they seek from nonprofit institutions to which they contribute. To many donors, public recognition of their donation is important. Corporate donors, in particular, may want the public to know of their gifts to the community. Also, donors that donate in honor or memory of a person or an event want their donation to be promptly and publicly recognized.

Donor recognition should be immediate and public and should correctly reflect how the donors wish to be acknowledged. Many organizations recognize donors quarterly or once a year in newsletter publications. Thus, donors may have to wait months to receive formal, public recognition of their donation. This may discourage repeat giving.

Because of the infrequent publication of donor recognition lists and the limited accessibility of the public to organizational newsletters, potential donors do not receive the kind of recognition that encourages original and repeat donations. Moreover, with the delay between the gift and the publication, a busy organization can make mistakes in acknowledging the donation as the donor requested.

SUMMARY OF THE INVENTION

Accordingly, it is an object of the invention to provide a method and apparatus for increasing charitable donations.

It is a further object of the present invention to provide such a method and apparatus that includes improving recognition of donors.

It is yet another object of the present invention to provide such a method and apparatus that provides instantaneous on-line recognition of donors.

It is still another object of the invention to provide a method and apparatus for non-profit organizations to develop small donors and to do so more cost effectively.

It is yet another object of the invention to provide such a method and apparatus that allows each donor to write his own acknowledgment.

It is still another object of this invention to provide such a method and apparatus that allows for centralized processing of electronic donations.

It is still a further object of the invention to increase donations through donor competition by using immediate feedback to competing donors.

The present invention provides a way for instantaneous public recognition of a donor. The invention provides a method for a donor to contribute through a computer network, preferably by supplying information to allow an electronic charge or transfer from the donors account. The names of the donors to the organization are displayed on a suitably organized and illustrated donor recognition electronic page, which is accessible to the public over the computer network Donor names are preferably linked to individual donor pages that include additional information about the donor and the donation.

When making a donation, a donor is presented on his computer monitor a screen that allows him to enter information about himself and his donation. The donor can preferably designate which parts of the entered information is to be publicly accessible. The entered information becomes part of a donor database that can be used by the non-profit organization for further donation development.

When the donation is complete, the designated information about the donor and donation becomes publicly accessible though the computer network, thereby providing immediate recognition. Because the donor himself writes the acknowledgment for the donation; there is no opportunity for misunderstanding between the donor and the organization. Moreover, because the donation processing and donor recognition are performed automatically, even the smallest donors receive instant recognition. Donations can be processed by the non-profit organization itself or by a third party servicer having expertise in electronic commerce. The immediate publication of donations facilitates competition among donors, encouraging each donor to contribute more than the others, thereby increasing the overall amount of contributions.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 2 shows a home page of a typical non-profit organization.

FIG. 8 shows a screen for selecting a method of payment.

DETAILED DESCRIPTION OF PREFERRED EMBODIMENTS

Figure 1:
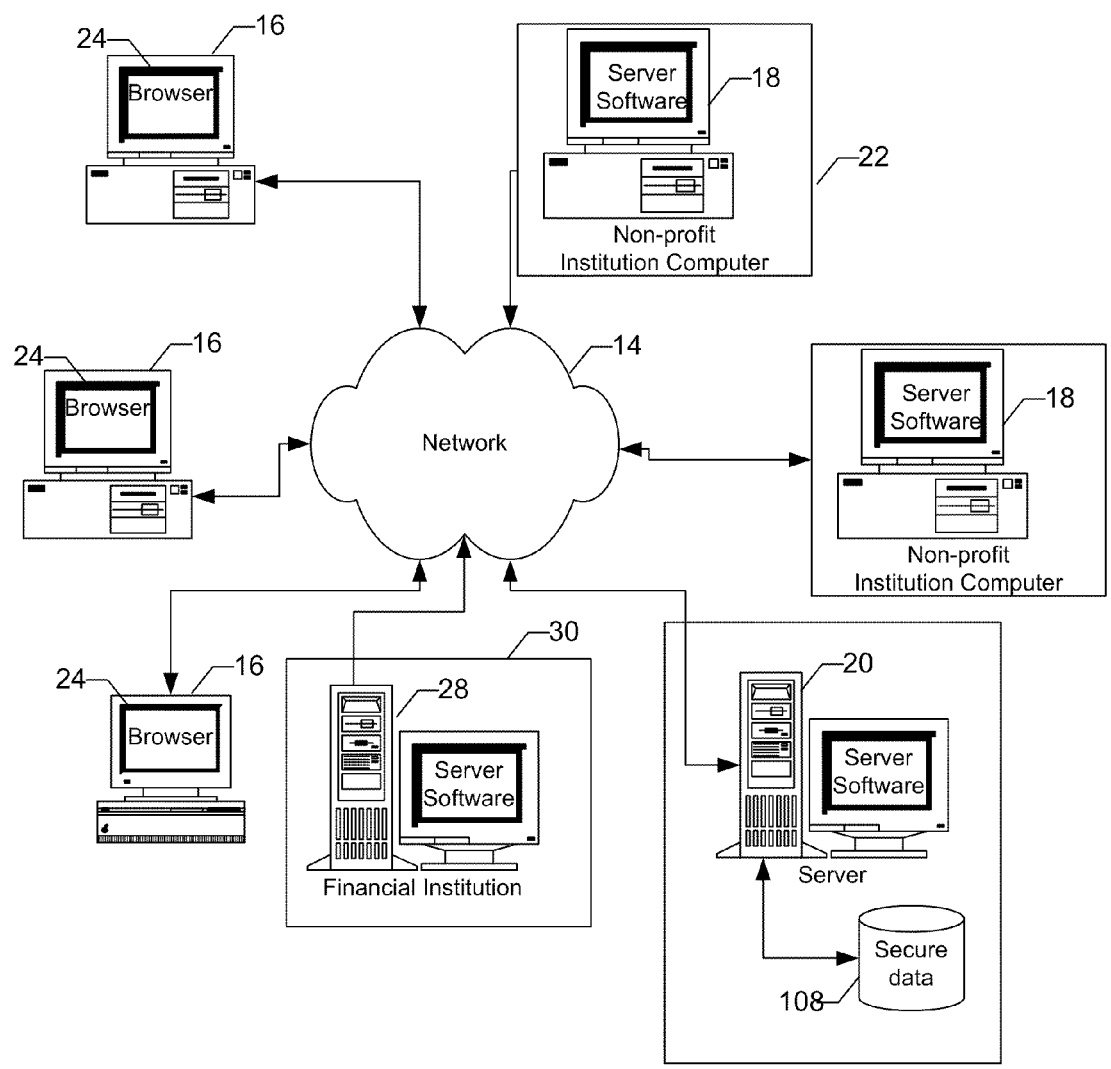
FIG. 1 shows a computer network over which a preferred embodiment of the invention is implemented.

FIG. 1 shows a computer network 14 that connects personal computers 16, institutional servers 18, and a third party donation servicer server 20. Institutional servers 18 are operated by non-profit organizations, such as a university 22, and personal computers 16 are operated by individuals, such as donors and others having an interest in the non-profit organizations.

Computer network 14 is preferably the World Wide Web (the Web) portion of the Internet. Institutional servers 18 and third party donation servicer server 20 may comprise, for example, Sun Solaris Supersparc Servers executing server software, such as that available from Apache Digital Corporation, Durango, Colo. Personal computers 16 may include, for example, computers such as Apple Macintoshes or Pentium-based computers using window-based operating systems. Personal computers 16 are executing commercially available Web browser software 24, such as Netscape Navigator or Microsoft Internet Explorer.

Third party donation servicer server 20 is also connected, either directly or through computer network 14, to one or more payment funding servers 28 operated by financial institution 30, such as VISAnet. If no third party donation servicer is present, institutional servers 18 are connected to payment funding server 28. Server 20 includes secure areas for sending receiving and storing sensitive personal and financial information.

Non-profit organizations often host a Web site on their institutional server 18 to provide information to interested parties. Information on a Web site is typically formatted in a hypertext mark-up language (HTML) and can include: text, programs, graphics, video, and audio portions. Although the preferred embodiment of the invention is implemented using an Internet Web site, the invention is not limited to any particular type of computer or computer network.

FIG. 2 shows a typical university home page 38 maintained on institutional server 18. Home page 38 includes links 44 to many areas of interest to supporters of, and others having some interest in, the organization. For example, home page 38 includes links to background information about the university, information for prospective students, news about research and athletic program, maps of the campus, directories of students and faculty, course information, and alumni information.

Figure 3:
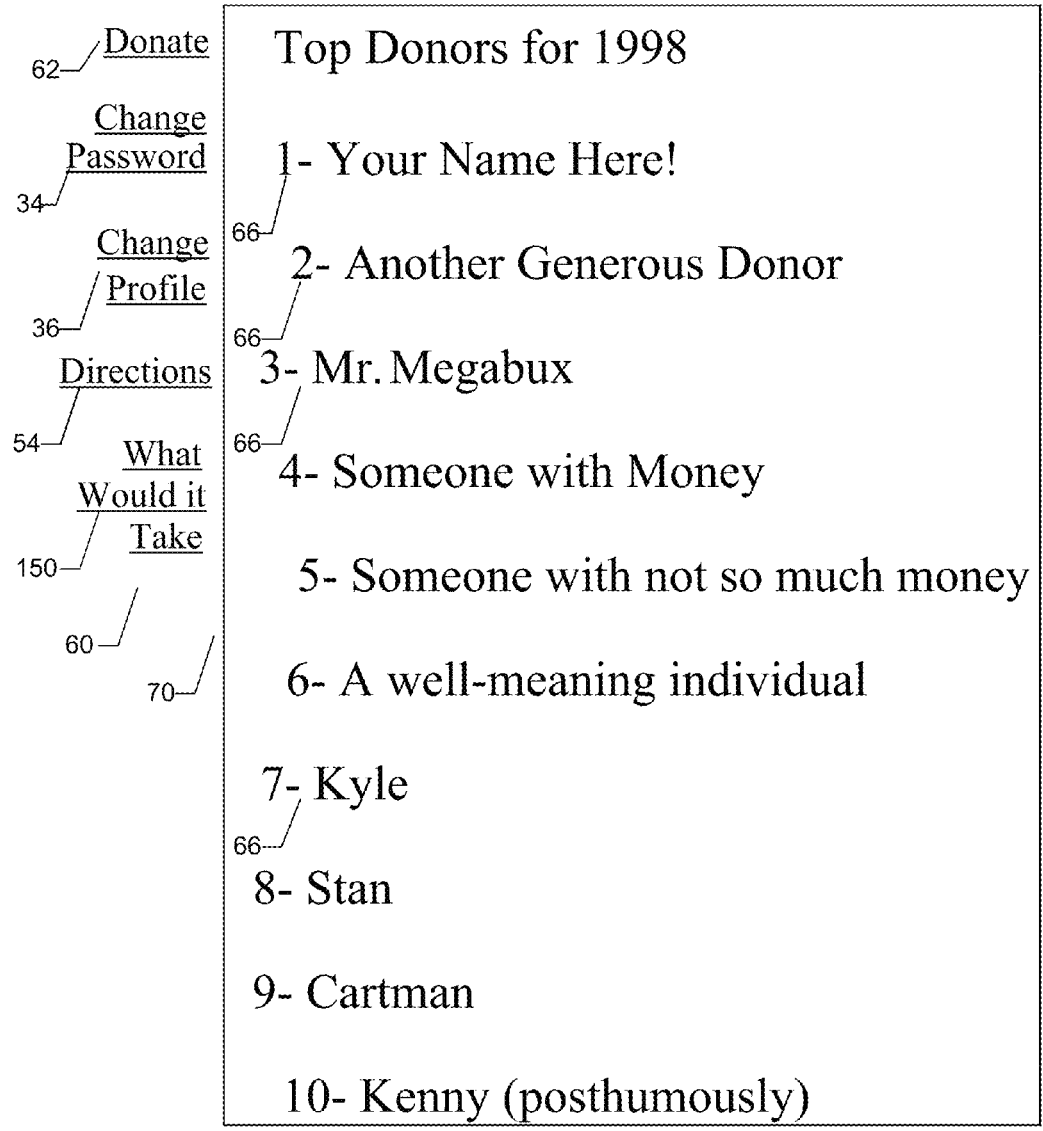
FIG. 3 shows a typical donor recognition page.

In accordance with the invention, home page 38 also includes a donor recognition page link 46. Upon following donor recognition page link 46, the donor is presented with a donor recognition page 60 (FIG. 3). Donor recognition page link 46 can be displayed as, for example, the word "Donations," "Contributions," "Support the School," or other such word or symbol. Donor recognition page 60 provides on-line recognition of donors and a donate link 62 that leads to a page for beginning the process of making a donation. Donor recognition page 60 also includes a link 64 to a page containing directions explaining how to use the donation system.

As the term "page" is used herein, a page can be composed of a single screen or multiple screens for displaying and entering of information, and the content of subsequent screens may depend on the entries made on previous screens or pages.

Although donor recognition page 60 shows donor names 66 displayed as a simple donor list 70 arranged in order of donation size, donor names 66 could be portrayed using suitable imagery, such as by having donor names 66 engraved on cornerstones. Donation amounts and messages, such as donation dedications, can also be displayed with the donor names 66. Donors wishing to remain anonymous may use a pseudonym or a statement in place of their name. Links to donor recognition page 60 may be included, not only on home page 38, but throughout the institution's web site. For example, donor recognition page 60 could be accessible from links on the alumni page and from pages related to specific programs for which donations are solicited.

Figure 4:
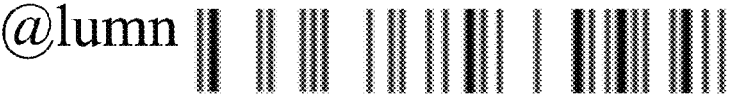
FIG. 4 shows a typical donor profile page, accessed through the donor recognition page of FIG. 3.

Donor names 66 function as links to donor profile pages, such as a donor profile page 72 shown in FIG. 4. Donor profile page 72 shows information entered by and about the donor. Information about the amount and purpose of a donation can be included with donor names 66 on donor recognition page 60, on donor profile page 72, or on both. Different donor profile pages could be provided for individuals and business.

Figure 5:
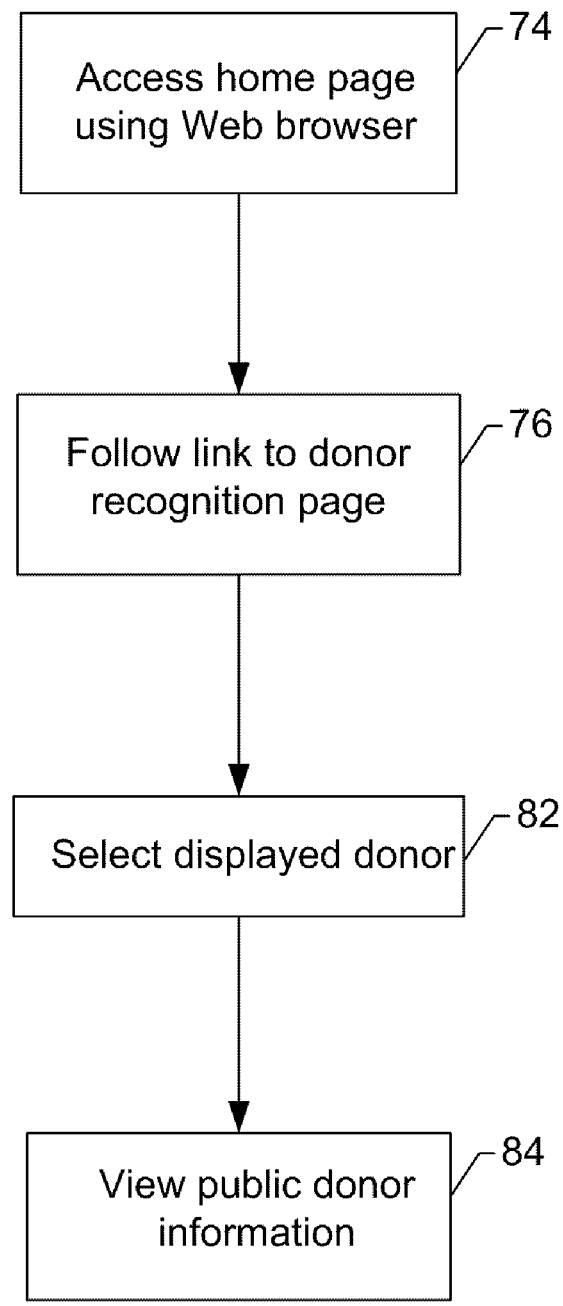
FIG. 5 is a flowchart showing the steps for viewing donor recognition information in accordance with a preferred embodiment of the invention.

FIG. 5 is a flow chart of the steps used to view donor information. Step 74 shows that a user accesses university home page 38 using Web browser 24 on a personal computer 16. From home page 38, the user selects donor recognition page link 46 to view donor list 70 in step 76. By selecting a name 66 in step 82, the user is presented with a corresponding donor profile page 72 in step 84.

Figure 6:
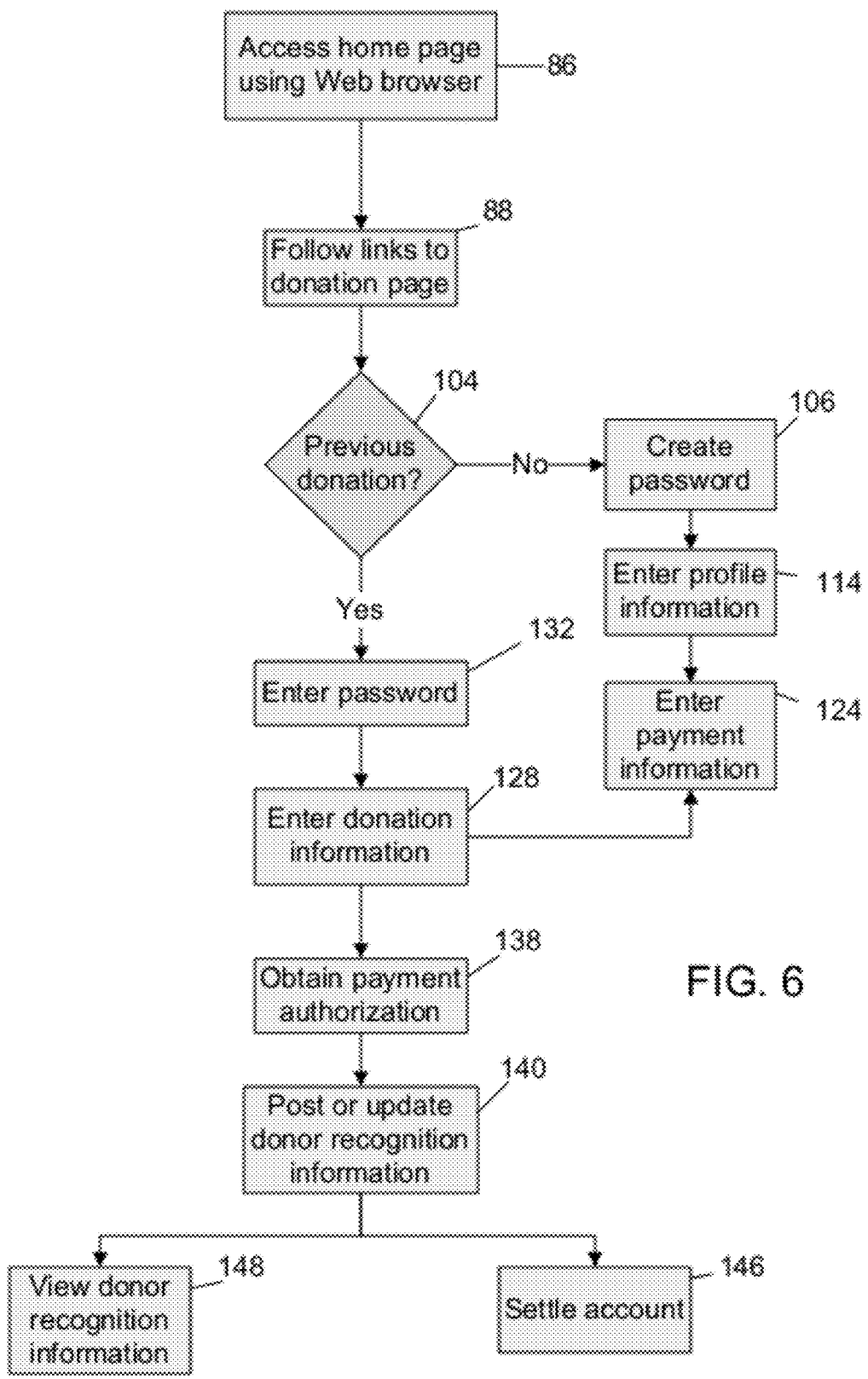
FIG. 6 is a flowchart showing the steps for making a donation in accordance with a preferred embodiment of the invention.
Figure 9:
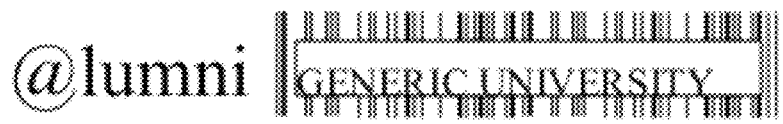
FIG. 9 shows a screen for entering a donation.

FIG. 6 is a flow chart showing the steps for making a donation in accordance with the present invention. Step 86 shows that a donor accesses home page 38 using Web browser 24 on a computer 16. Step 88 shows that the donor selects appropriate links to reach a donation screen shown in FIG. 9. For example, the donor may select donor recognition page link 46 from home page 38 and then select a donate link 62 from donor recognition page 60. Upon selecting the donate link 62, the donor is connected to a secure area of server 20 to protect the confidentiality of personal and financial information that will be transmitted.

Step 104 shows that server 20 presents the donor with a form-type screen that asks the user if he has made a previous donation. All such form-type screens are typically created in HTML using the <form> tag, and the information entered onto the forms is typically processed using programs written in C, C++ or Perl and using the common gateway interface (CGI) protocol.

If the donor has not previously donated, server 20 presents the donor in step 106 with a screen for creating an account by entering user identification and a password. The user identifier is checked for uniqueness before being accepted by server 20, and the password is saved in an encrypted database 108 (FIG. 1). Although it is preferable to create donor accounts to facilitate repeat giving, the invention can be implemented without donor accounts, although the donor would be required to enter personal and payment information with each donation.

Figure 7:
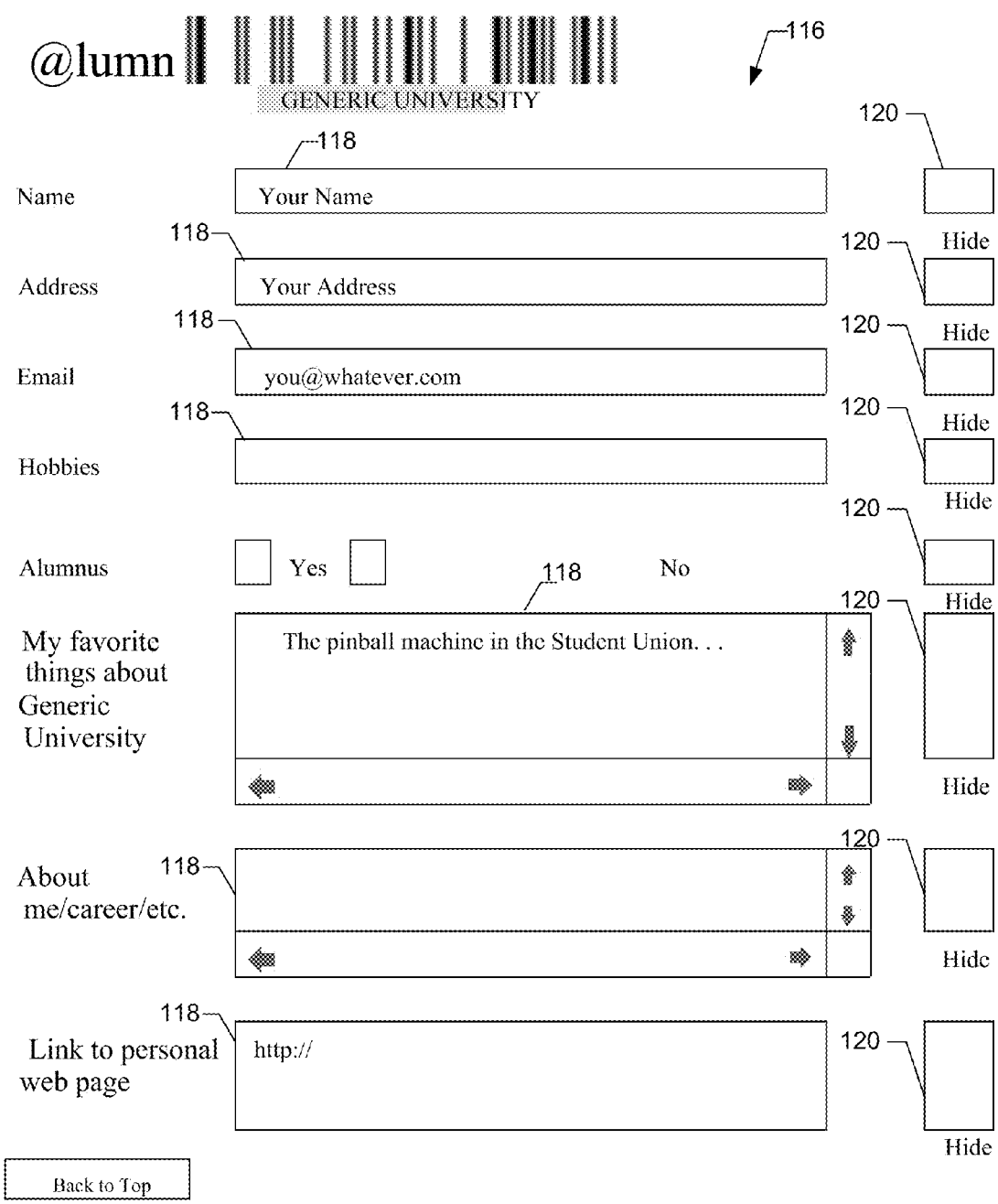
FIG. 7 shows a donor profile entry form, used by the donor to enter the information for display in the donor profile page of FIG. 3.

After the user account is established, server 20 presents the donor in step 114 with a donor profile entry form 116 (FIG. 7) that requests information to create a donor profile. Profile form 116 includes fields 118 for entering information to identify the donor, as well as any other information that the nonprofit organization believes would be useful for donation development. For example, if the non-profit organization is an institute of higher education, the screen may request information such as whether the donor is an alumnus of the institution, the donor's year of graduation, degree, etc. Different profile forms could be presented, depending on whether the donor was an individual or a business. Profile form 116 could also allow the donor to select clip-art drawings to decorate his profile page 72.

In a preferred embodiment, the donor would have the option of indicating which fields 118 are to be published on his donor profile page 72 for viewing by anyone visiting the institution's site and which fields 118 are to be accessible only to the staff of the non-profit organization. The donor can indicate which information is not to be published, for example, by checking a hide box 120 next to the fields 118 he chooses not to publish. A donor thus has complete control over what information, if any, will be published on the Web page. A donor can also chose to leave incomplete portions of donor profile entry form 116. The only mandatory information is that which is required to process the payment.

After receiving the personal information, step 124 shows that payment information is requested from the donor. The methods of payment available are preferably electronic and can include credit cards, debit cards, billing a telephone number account, or payroll deduction. FIG. 8 shows a screen 126 for selecting a method of payment. The invention is not limited to any particular method of transferring funds. An option for mailing a payment may also be included, although a mailed donation is preferably not recognized until the funds are collected.

After a payment method is selected, an appropriate screen is displayed to the donor to collect the information necessary to process that type of payment. For example, if credit card payment is chosen, a subsequent screen would have the user enter the credit card type, credit card number, expiration date, and cardholder's name. If debit card payment is selected, the subsequent screen would request the account number and personal identification number. The part of the server used to handle sensitive information, such as credit card and bank account numbers, is secure, and information transmitted to or from the secure server is encrypted and/or authenticated by known methods so that it cannot be intercepted or forged by others on the Internet. The donor is now ready to enter his donation in step 128.

If the donor had indicated in step 104 that he has previously donated, he would have been presented in step 132 with a screen requesting him to enter his password. Upon successful comparison of the entered password with the password stored in the database, the donor would proceed immediately to step 128 to enter his donation using a donation screen 92 shown in FIG. 8. The personal and charge information will be drawn from the secure area of the server upon entry of the account name and password. Repeat donations are thus encouraged by simplifying the process. For added security, additional information can be requested from the donor using a password, particularly in the event of a large donation exceeding a predetermined threshold amount. A donor can change his password at any time by following a change password link 134 from donor recognition page 60. Although the donor is not required to reenter his profile and payment information, he has the option to change the information is he chooses by following a change profile link 136 from donor recognition page 60. On donation screen 92, a donor is given an option to allocate his donation to a specified program. A default allocation can be used. If donor recognition page 60 was accessed through a link indicating an allocated payment, such as "Donate to the Humanities Program," the default allocation is to that program, although the donor has the opportunity to change the allocation.

Donation screen 92 also provides one or more fields for entry of an optional dedication message from the donor. For example, a donor's message might read "Miller's Used Cars supports the HSU Beavers—William Miller, Class of '63" and could also include a link to the home page of Miller's Used Cars. Other examples of messages include "In loving memory of William Miller, Class of '42" or "Congratulations to the Class of 2000." Appropriate clip art could also be selected by the donor to use with his message. The publicly displayed text fields can be screened by the institution to eliminate inappropriate content, either automatically or manually.

When the donor completes donation screen 92 and posts the form, payment information is sent over the computer network in step 138 to the appropriate funding institution to authorize the payment. For example, a payment made rising a VISA card would be verified and credited over the VISAnet system. If the authorization system fails to authorize the funds, the donor is informed and requested to correct the entered information or, if there is no data entry error, to select another payment option. Methods for electronic commerce are known in the art and are described, for example, in U.S. Pat. No. 5,710,887 to Chelliah et al for "Computer System and Method for Electronic Commerce" and U.S. Pat. No. 5,715,314 to Payne et al. for "Network Sales System."

Once payment is authorized, step 144 shows that the donor information is published on donor recognition page 60, and the link to profile page 72 is activated. After the donor information has been published, the account is settled in step 146 and the donor can view the posted information in step view 148.

Donor recognition page 60 can be expanded to an elaborate set of donor recognition pages. Donor recognition pages can be customized using, for example, symbols or mascots associated with the institution. The donor recognition page could appear, for example, as a plaque, with donors divided into groups based upon the amount of the donation or other criterion. For example, individuals that donated $10,000 or more may be at the top, followed by $5,000 donors, $1,000 donors, etc. The amount of space provided to each donor on his profile page or information available, such as the number of lines of text, could be made dependent on the size of the donation. The amount of each donation could be published or not, in accordance with the desire of the donor.

All information relating to donations made through the donor recognition page is maintained in a donor information database. The on-line donation information can be sorted and summed on different fields. For example, when an individual gives a repeat donation, the donor recognition page could display the donor's total contributions for the year.

Besides encouraging donors by providing immediate public recognition, the present invention can also be used to encourage donations by promoting competition between donors. For example, donor recognition page 60 includes a "what-would it-take" button 150 that upon activation shows a potential donor what donation level would be required to achieve a specified position in donor list 70. To use "what-would-it-take" button 150, a potential donor selects a position number on donor list 70, such as by highlighting the position, and double clicks button 150. Server 20 then determines and displays the donation level required for the potential donor to move into that position on list 70. The determination may entail, for example, adding a fixed amount to the donation of the current holder of the position. If the potential donor has logged into server 20, it could use stored information about the potential donor's previous donations to determine the incremental donation required to reach the required donation level.

Non-profit institutions can also use the present invention to create donation competitions between groups, such as different graduating classes or different schools in a university. The information collected from donors can identify each donor as a member of a group, such as a graduating class, and then individual donations can be totaled for each graduating class. Because donations are processed immediately and automatically, donation totals can be continually updated and displayed by graduating class, thereby encouraging members of each class to donate more and win the competition. As the donation total for a class increases, it is immediately visible to members of other classes, who are thereby spurred to increase their donations. The overall contribution from such a real-time, on-line campaign could be significantly greater that the contributions realized from prior art donation campaigns.

Even without a formal competition, the donations can be totaled on different fields and the totals publicly displayed on the web site to spur donations from groups or as a statistical basis to plan donation development. The database also provides a ready-made mailing list, allowing the organization to easily keep in contact with donors.

Although the invention can be implemented entirely by an individual non-profit organization servicing its on donations, a third party donation servicer could process donations for more than one non-profit organization. The third party donation servicer can supply expertise in on-line commerce that the individual non-profit organization may lack. By handling a large volume of charges or funds transfers, the third party donation servicer can reduce bank service charges. Using a third party donation servicer to verify and collect funds, the non-profit organization would not be required to obtain and be responsible for the security of sensitive information such as credit card and bank account information.

I claim:

1. A method of providing recognition for donors donating to non-profit organizations, the method comprising:
   transmitting to a donor over a computer network an electronic form for the donor to use to enter a donation to the non-profit organization;
   receiving over the computer network form data entered by the donor into the electronic form, wherein the form data include an amount of the donation and payment information;
   obtaining over the computer network an electronic payment authorization from a financial institution association with the donor; and
   in response to obtaining the electronic payment authorization from the financial institution, automatically adding the donor to a publicly available donor list published on the computer network.

2. The method of claim 1 further comprising:
   receiving over the computer network for data entered by the donor into the electronic form, wherein the form data include additional information about the donor; and
   presenting to a person viewing the donor list through the computer network the additional information about the donor in response to selecting a donor from the list.

3. The method of claim 1 in which the received form data include personal information and an indication of what parts of the personal information will be made publicly accessible over the computer network.

4. The method of claim 1 in which the received form data include a credit card number or a bank account number.

5. The method of claim 1 in which the donor list is arranged by size of donation and further comprising displaying the size of donation required to obtain a position on the list.

6. The method of claim 1 in which the step of automatically adding the donor to a publicly available donor list published on the computer network is performed by a third-party donation servicer.

7. The method of claim 1 in which the step of automatically adding the donor to a publicly available donor list published on the computer network is performed by the non-profit organization.

8. The method of claim 1 in which the step of automatically adding the donor to a publicly available donor list published on the computer network is performed immediately upon obtaining the payment authorization from the financial institution.

9. A system for providing recognition for donors donating to non-profit organizations, the system comprising:
   a network server in data communication with one or more client computers via a computer network, the network server including a computer processor coupled to a computer memory and a network interface; and
   a computer program encoded within the memory, said computer program comprising computer-executable instructions that, when executed by the processor, cause the network server to perform the steps of:
   transmitting over the computer network an electronic form to a client computer, the electronic form used by a donor to make a donation to the non-profit organization;
   receiving, from the client computer over the computer network, form data entered by the donor into the electronic form, wherein the form data include an amount of the donation and payment information;
   obtaining over the computer network an electronic payment authorization from a payment funding server of a financial institution associated with the donor; and
   in response to obtaining the electronic payment authorization from the financial institution, automatically adding data identifying the donor to a publicly available donor list published on the computer network.

10. The system of claim 9 in which the received form data include personal information and an indication of what parts of the personal information will be made publicly accessible to a plurality computer of users over the computer network.

11. The system of claim 9 in which the received form data include a credit card number or a bank account number.

12. The system of claim 9 in which the donor list is arranged by size of donation and further comprising displaying the size of donation required to obtain a position on the list.

13. The system of claim 9 in which the step of automatically adding data identifying the donor to a publicly available donor list published on the computer network is performed by the network server.

14. The system of claim 9 in which the step of automatically adding data identifying the donor to a publicly available donor list published on the computer network is performed by a server of the non-profit organization.

15. The system of claim 9 in which the step of automatically adding data identifying the donor to a publicly available donor list published on the computer network immediately upon obtaining the payment authorization from the financial institution.

16. A non-transitory, computer-readable medium for providing recognition for donors donating to non-profit organizations, the computer-readable medium comprising:

a computer program encoded within the non-transitory computer-readable medium, said computer program comprising computer-executable instructions that, when executed by a computer processor, cause a computer to perform the steps of:

transmitting over the computer network an electronic form to a computer user to use to make a donation to the non-profit organization;

receiving over the computer network form data entered by the computer user into the electronic form, wherein the form data include an amount of the donation and payment information;

obtaining over the computer network an electronic payment authorization from a payment funding server of a financial institution associated with the donor; and in response to obtaining an electronic payment authorization from the financial institution, automatically adding data identifying the computer user to a publicly available donor list published on the computer network.

17. The non-transitory, computer-readable medium of claim 16 in which the received form data include personal information and an indication of what parts of the personal information will be made publicly accessible to a plurality of computer users over the computer network.

18. The non-transitory, computer-readable medium of claim 16 in which the received form data include a credit card number or a bank account number.

19. The non-transitory, computer-readable medium of claim 16 in which the donor list is arranged by size of donation and further comprising displaying the size of donation required to obtain a position on the list.

20. The non-transitory, computer-readable medium of claim 16 in which the step of automatically adding the donor list to a publicly available donor list published on the computer network is performed by a third-party donation servicer.

21. The non-transitory, computer-readable medium of claim 16 in which the step of automatically adding the donor list to a publicly available donor list published on the computer network is performed by the non-profit organization.

22. The non-transitory, computer-readable medium of claim 16 the step of automatically adding the first computer user to a publicly available donor list published on the computer network immediately upon obtaining the payment authorization from the financial institution.

* * * * *